United States Patent [19]
Tilp

[11] 4,100,394
[45] Jul. 11, 1978

[54] ELECTRIC WATER HEATER AND HOT WATER DISPENSER

[75] Inventor: George E. Tilp, Short Hills, N.J.

[73] Assignee: Adams Industries, Inc., Union, N.J.

[21] Appl. No.: 640,182

[22] Filed: Dec. 12, 1975

[51] Int. Cl.² .............. H05B 1/00; A47J 31/057; F24H 1/10; F04B 19/24

[52] U.S. Cl. .......................... 219/296; 99/281; 99/310; 99/312; 219/438; 219/441; 222/146 HE; 417/209

[58] Field of Search .............. 219/296, 297, 299, 314, 219/441, 442, 436, 438; 222/146 HE; 417/207–209; 99/279–283, 288, 290, 292–295, 300–315

[56] References Cited

U.S. PATENT DOCUMENTS

| | | | |
|---|---|---|---|
| 751,565 | 2/1904 | Savage et al. | 99/312 |
| 879,096 | 2/1908 | Gaunt | 99/312 |
| 997,845 | 7/1911 | O'Mara | 99/310 |
| 1,111,029 | 9/1914 | Nelson | 417/208 |
| 1,573,668 | 2/1926 | Wood | 417/209 X |
| 1,922,782 | 8/1933 | Schallis | 417/208 |
| 2,046,710 | 7/1936 | Umstott | 99/314 |
| 2,107,924 | 2/1938 | Adams | 99/281 |
| 2,233,256 | 2/1941 | Gonzalez | 99/313 |
| 2,248,595 | 7/1941 | Weeks | 99/281 UX |
| 2,817,743 | 12/1957 | Foster | 99/310 X |
| 2,844,087 | 7/1958 | Luckhurst | 99/312 X |
| 3,669,694 | 6/1972 | Nauheimer et al. | 99/310 |
| 3,858,494 | 1/1975 | Martin | 99/312 |
| 3,987,717 | 10/1976 | Bergmann et al. | 219/442 X |
| 3,996,846 | 12/1976 | Hupf | 99/310 |

*Primary Examiner*—A. Bartis
*Attorney, Agent, or Firm*—Edward R. Weingram

[57] ABSTRACT

A container or reservoir for liquid to be heated, has a pump well and heater assembly secured to and depending from the bottom wall of the container, and a pump and pump tube assembly can be positively locked on the well for pumping function but is easily and quickly removable for cleaning or replacement. The assembly is locked on the well by a retainer plate fixed to an outer pump tube and having locking portions coactive with locking portions on the side wall of the well, with said outer tube being telescopically slidable and rotatable on an inner pump tube which carries a pump plate to seat in the well and a valve disk co-operative with said valve plate. A compression spring is disposed between the retainer plate and the pump plate locking portions to hold the retainer plate interlocked with the well locking portions and to hold the pump plate seated in the well. The container has a platform for a hot water receiver, and also has a combined cover and spout overhanging said platform to dispense water into such a receiver.

14 Claims, 8 Drawing Figures

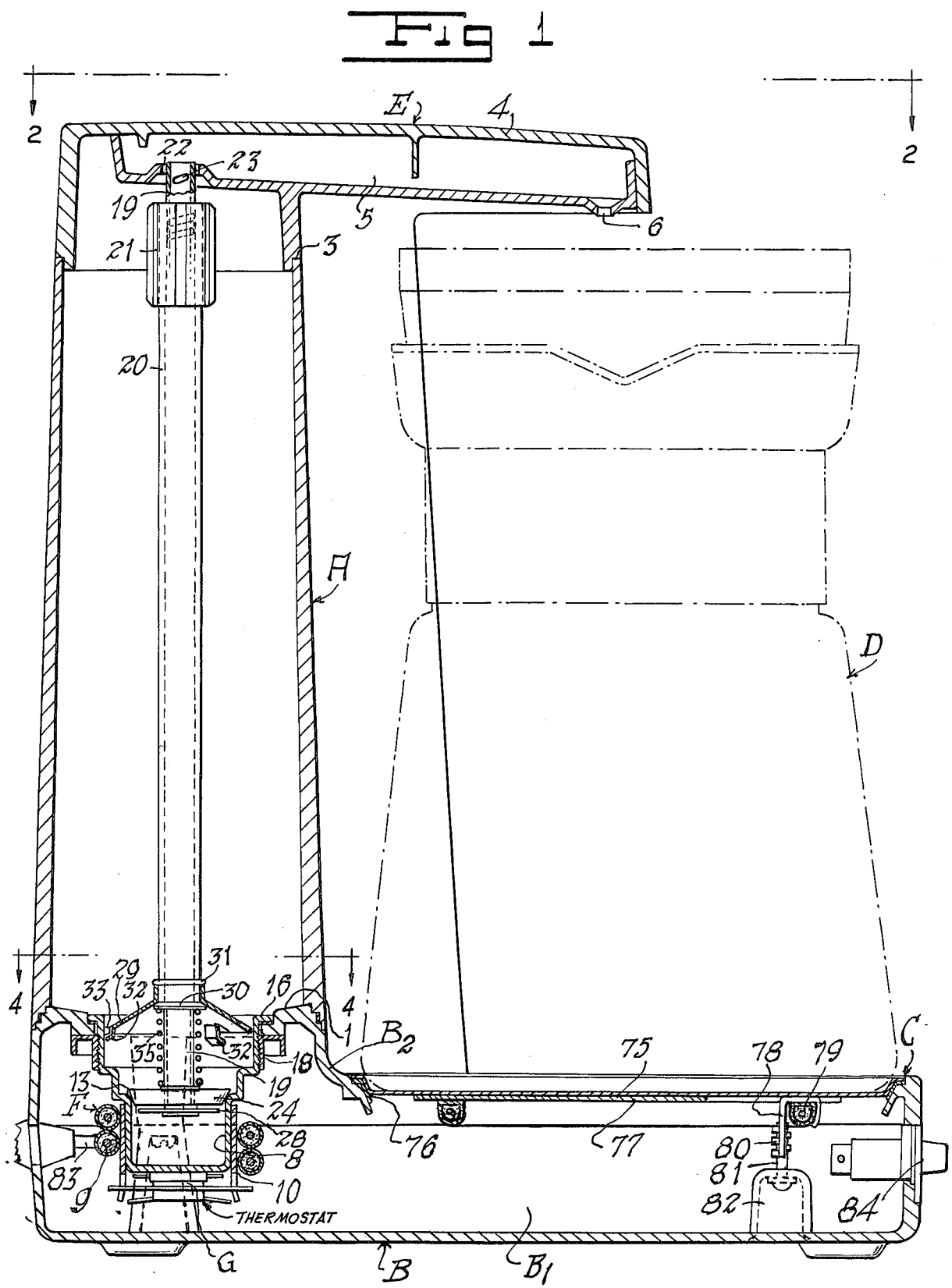

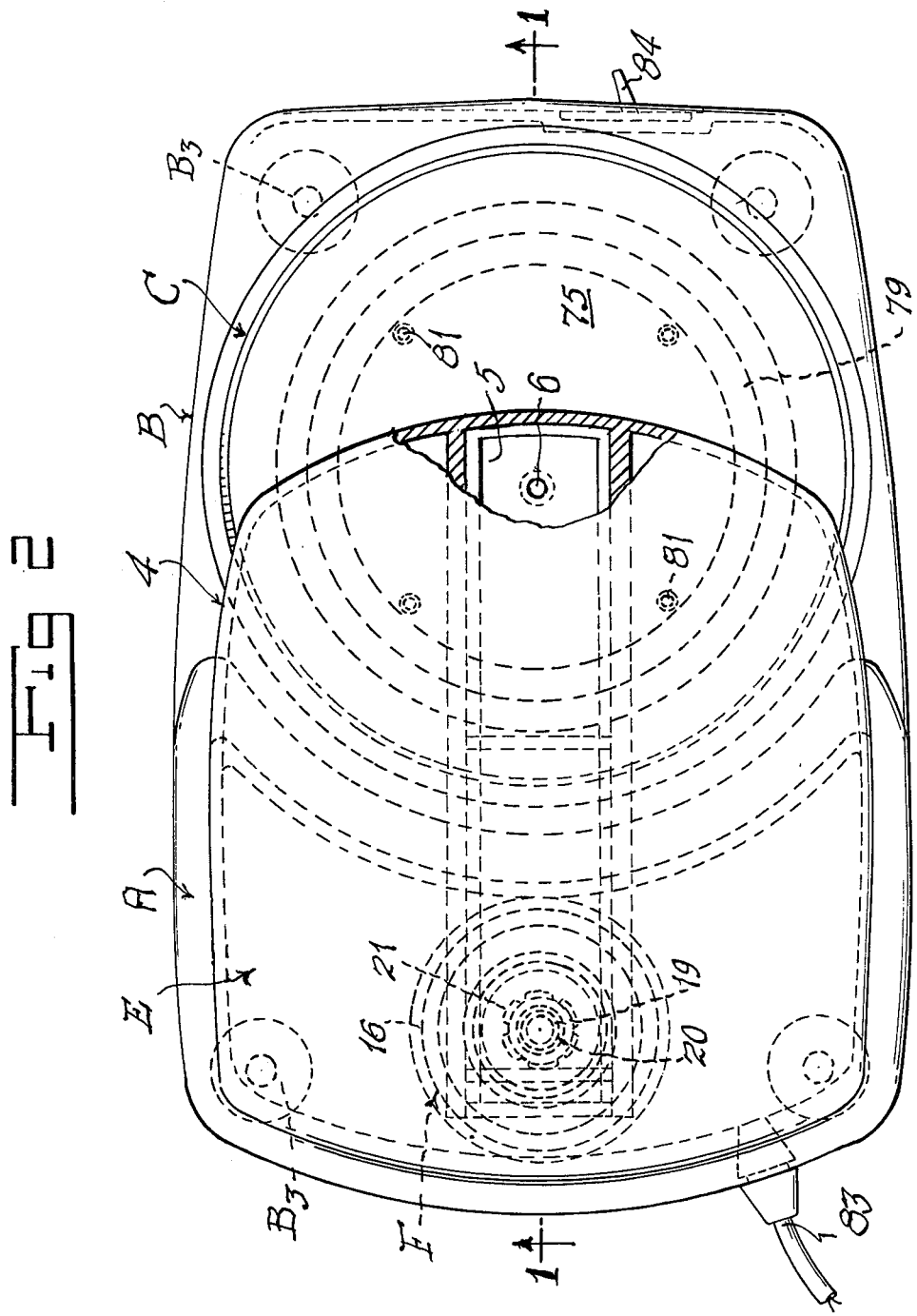

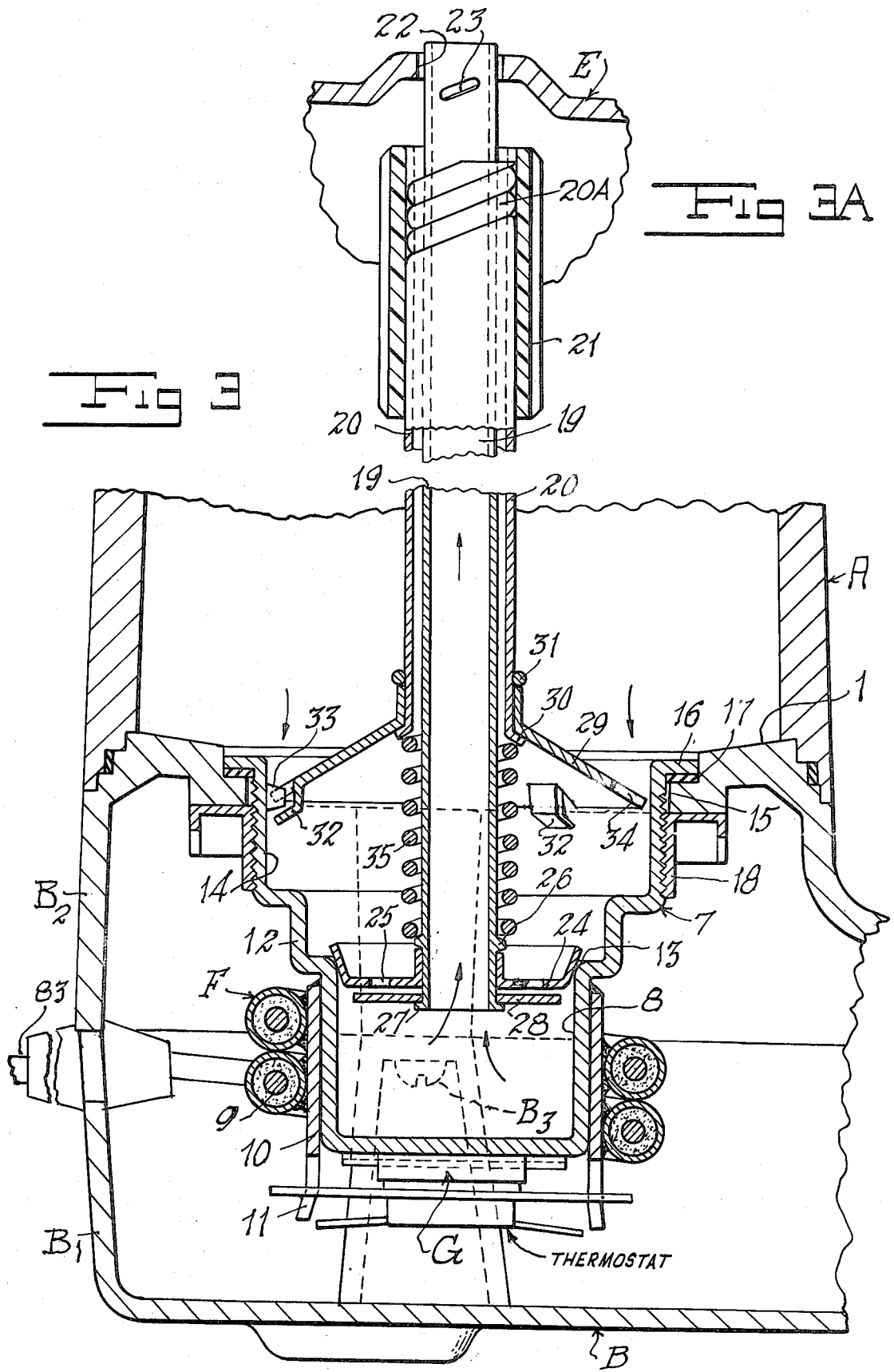

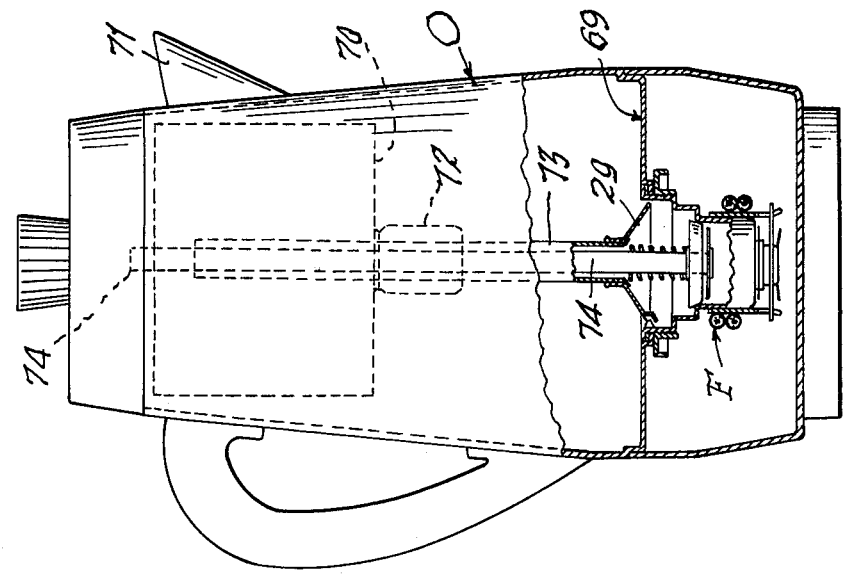
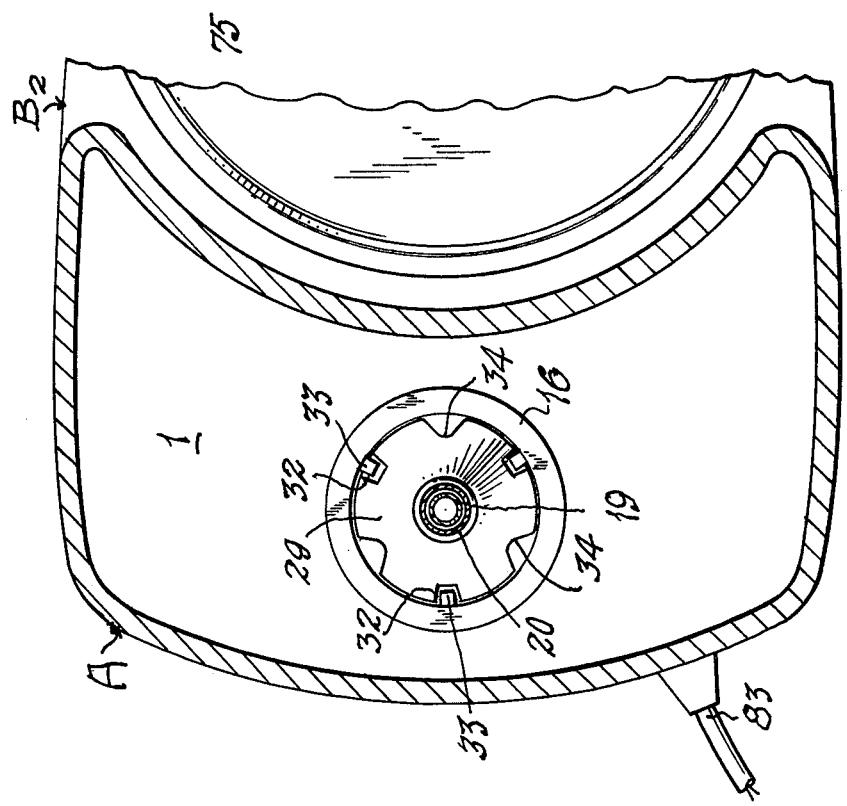

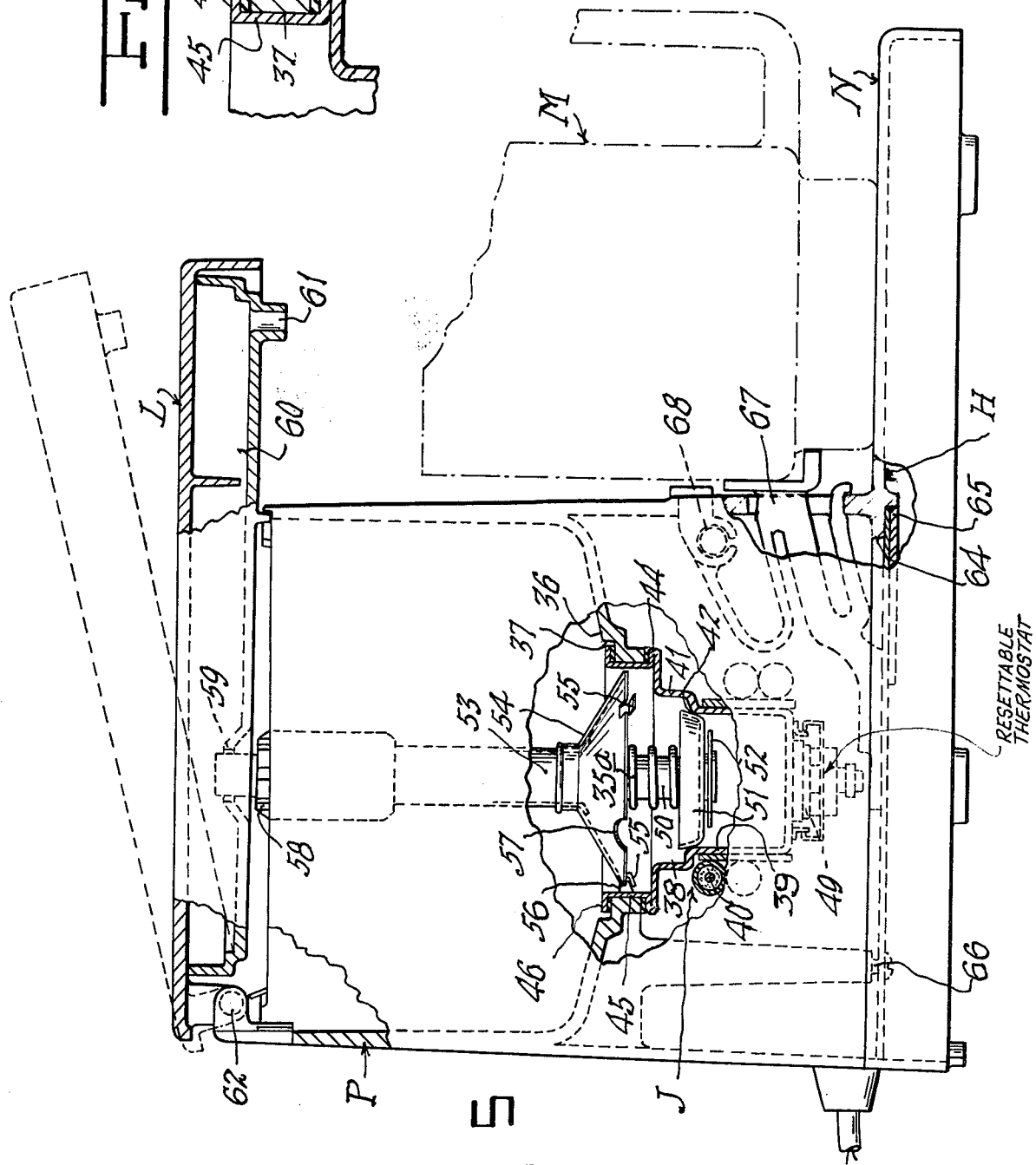

ELECTRIC WATER HEATER AND HOT WATER DISPENSER

BACKGROUND OF THE INVENTION

This invention relates to automatic water heaters and the dispensing of heated water for any purpose, for example, for making hot beverages such as tea, instant coffee and cocoa; and more particularly the invention contemplates the pouring of hot water over ground coffee in a manner suitable to the methods of percolator, filter or drip coffee making.

To heat the water and accomplish the above by the methods of the prior art, the water is made to flow through tubing, pipes or containers which are heated by electric heaters attached to the outside or mounted on the inside of the pipes or containers. The piping arrangement through which the water has to flow to be heated is practically inaccessible for cleaning.

In the process of heating the water with devices or apparatus of this character, many of the minerals contained in the water adhere to the hot surfaces and form a tight scale. As a result of the repeated use of the apparatus this tight scale of mineral deposits builds up in thickness, which reduces the proper heat transfer and will in time prevent the heating function, unless the scale is removed.

To remove the scale, prevent the excessive scale build up and clean the heating surfaces, a suitable washing solution such as vinegar and water in equal parts must be run through the heating cycle of the unit, preferably more than once, with interruption to make allowance for soaking time. This cleaning method must be followed by a thorough rinsing and must be continued on an approximate monthly schedule for the life of the heating unit.

SUMMARY OF THE INVENTION

It is in part an object of this invention to eliminate the special cleaning process described above. The heating surface is subjected to the same build up of scale from the mineral deposits, but the heating surfaces can be cleaned frequently, the same as an electric percolator, because the heating unit can be taken apart completely, as will appear from the following description and the accompanying drawings.

Similar to an electric percolator, a heated well and pump is used to heat the water and pump the hot water to a suitable level from where it is channeled to be discharged for the intended purpose. The apparatus according to this invention provides unique features that constitute important improvements over the prior art.

It is recognized that whenever the principle of a heated well and pump is used, it is essential that the pump assembly be held firmly against the seat of the well to ensure proper operation. In percolators involving pumps and coffee holding baskets in water containers, this is accomplished by applying light spring pressure against the pump-basket assembly, generally by pressure against the top lid of the container. An allowance for this must be made by the method of holding the lid to the percolator body. As a result of this, it often happens that when the lid is pulled off, the sudden release of the spring pressure often causes the pump and basket to bounce off the well seat, which is an undesirable condition. According to my invention this can't happen.

It is in part an object of this invention to provide an independent self-contained pump-valve-tube assembly, which can be placed in position with the well and will remain releasably locked securely in position to perform the pump function, without any coaction of other parts such as the lid, to assist in its function and which when desired, can be easily and quickly manually released from the well for easy and thorough cleaning of the pump, tube and well.

Further objects of the invention are to provide a novel and improved construction and combination of a liquid container or reservoir, a heater and pump well assembly, and a pump and pump tube assembly, wherein there is means for positively but releasably locking the pump and pump tube assembly on the pump well without any coaction of other parts such as the cover or lid of the liquid container; and to provide novel and improved means for releasably locking the pump and pump tube assembly in operative position on the well, comprising a retainer plate on the pump tube, and coactive locking portions of the retainer plate and the wall of the pump well to positively but separably interlock the pump and pump tube with the well.

As usual the pump includes a perforated pump plate secured to the pump tube for tight contact with a seat on the side wall of the well, and a valve disk mounted on the pump tube for limited movement toward and away from the plate. In accordance with the invention there is an inner pump tube carrying the valve plate and valve disk, and an outer pump tube telescopically slidable on the inner pump tube and on which the retainer plate is fixedly mounted, there being a finger piece on the outer tube and a compression spring between the retainer plate and an abutment flange on the inner tube, whereby the valve plate is yieldingly held on said seat on the pump well, and said locking portions of the retainer plate are yieldingly held in engagement with the coacting locking portions on the wall of the pump well.

The invention also provides novel means for securing the pump well and heater assembly with a liquid-tight joint on and in depending relation to the bottom wall of the liquid container, one form of such means enabling rapid and easy replacement of the assembly and another form making a permanent connection of the assembly to the bottom wall of the liquid container.

A platform for a hot liquid receiver, for example a cup or pitcher projects perpendicularly from the bottom of the liquid container or reservoir, and said container has a removable combination cover and dispensing spout whose discharge end overhangs said platform to direct hot liquid into a receiver on the platform for a desired purpose, such as making a hot beverage.

Other objects advantages and results of the invention will appear from the following description in conjunction with the accompanying drawings in which:

FIG. 1 is a vertical longitudinal sectional view on the plane of line 1—1 of FIG. 2, of an electric water heater and water dispenser embodying the invention;

FIG. 2 is a top plan view the electric water heater and dispenser from the plane of the line 2—2 of FIG. 1, with portions shown in horizontal section;

FIG. 3 is a fragmentary view on an enlarged scale of the lower portion of FIG. 1 with portions broken away;

FIG. 3A is a similar view of the upper portion of FIG. 1;

FIG. 4 is an enlarged fragmentary horizontal sectional view on the plane of line 4—4 of FIG. 1;

FIG. 5 is a side elevation of another form of water heater and dispenser embodying the invention with portions broken away and shown in vertical section;

FIG. 6 is a fragmentary view on an enlarged scale of a portion of FIG. 5; and

FIG. 7 is a side elevational view of a percolator embodying the pump well, pump and heater assembly shown in FIG. 1.

DESCRIPTION OF THE PREFERRED EMBODIMENT

Referring to FIGS. 1 to 4, the reference character A designates a container or reservoir for liquid to be heated, whose bottom wall 11 is formed by a portion of the top wall 2 of a base B comprising two sections $B_1$ and $B_2$ separably connected in conventional manner by bosses and screws $B_3$ a portion of which base projects perpendicularly and horizontally from the container to provide a platform C for a hot water receiver, such as a cup of pitcher that is delineated by dot and dash lines and denoted D. The container also has a removable combined cover and dispensing spout E. Here the cover could be hinged but is shown as having a slip fit connection 3 with the container wall, and a spout portion 4 which is formed with a passage 5 to receive water from the pump, and which overhangs the platform to dispense the water through an outlet 6 into any receiver D on the platform.

The bottom wall 1 of the container has removably secured thereto and depending therefrom a pump well and electric heater assembly F. The well 7 preferably is formed of stainless steel and includes a lower cup-like portion 8 wherein the heating of the water takes place. A known type of high wattage electric heater in the form of a tubular metal shielded heating element 9 is coiled around the well portion 8 with a well sleeve 10 between them, said well portion, the heating element and the well sleeve preferably being joined together by brazing to form a metallurgical bond, thereby to provide for efficient heat transfer and a permanent assembly of the parts. A temperature control thermostat G is secured in any suitable manner to the outer side of the bottom of the well portion 8, preferably by utilizing tabs 11 that extend from the wall sleeve.

The well also includes a portion 12 of larger diameter than the portion 8 providing a pump seat 13 between them. Above the portion 12 is a portion 14 of larger diameter which is adapted to be disposed in a hole 15 in the bottom wall 1 of the container and has a perimetral flange 16 to overlie the upper side of said bottom wall with a sealing ring 17 between them. A nut 18 is screwed on said well portion 14 to abut the lower side of said bottom wall and thus firmly but separably connect the well to the container.

The pump and pump tube assembly comprises an inner tube 19 and an outer tube 20 telescopically, slidably and rotatably mounted on the inner tube and having on its upper end a finger piece 21, preferably of heat-insulating material. The upper end of the inner tube extends beyond the upper end of the outer tube and loosely through a hole 22 into the spout passage 5 of the combined cover and dispensing spout E. A segment of a thread 23 is embossed on the projecting end of the inner tube and coacts with an inwardly embossed thread 20A on the outer tube to permit assembly of the outer tube over the inner tube and to hold the two tubes against separation when the thread segment 23 is disposed outwardly of the end of the outer tube as shown in FIG. 1.

A known type of pump plate 24 having perforations 25 is mounted on the lower end of the inner tube between an exterior circumferential bead 26 and an end flange 27, to seat on the well seat 13, and a valve disk 28 is loosely mounted between the lower side of the pump plate and the flange 27 for limited movement toward and away from the pump plate. The pump functions in the known manner when the water boils in the well portion 8 so the hot water is pumped through the inner tube 19 into the spout passage 5 for dispensing through the discharge opening 6 into a receiver on the platform B.

In accordance with the invention, the pump and pump tube are positively but removably locked on the well seat 13 in pumping position by means including a retainer plate 29 which is of smaller diameter than the portion 14 of the well and is fixedly mounted on the lower end of the outer pump tube between a flange 30 and a bead 31 and has preferably stamped therefrom circumferentially spaced locking fingers or detents 32 to coact with circumferentially spaced locking lugs 33 on the inner surface of the well portion 14. Spaced alternately to the fingers 32 are notches 34 in the edge of the plate to provide clearance for the lugs 33 during insertion and removal of the pump and retainer plate from the pump well. To insert the pump and tube assembly in operative pumping position and reservoir cover E is removed and the assembly is manually held by the finger piece 21 and placed over the well with the notches 34 in alinement with the lugs 33, and then the assembly is pushed into the well until the pump plate 24 contacts the well seat 13. The outer tube is pushed further by compressing the outer spring and is then engaged by rotating the outer tube until the retainer fingers 34 underlie and engage the lugs 33 as shown best in FIG. 3. This position is maintained by a helical high deflection low pressure spring 35 on the inner pump tube interposed between the bead 26 on said inner tube and the flange 30 on outer pump tube. The spring 35 thus holds the retainer plate locked in the well and at the same time holds the pump plate in tight contact with the well seat. Then the cover E is placed in closing position on the container as shown in FIG. 1, entirely out of contact with the pump tube which extends loosely through the hole 22 in the cover. For removal of the pump and pump tube assembly, the cover is removed, the finger piece 21 is gripped and pressed downwardly against the spring pressure and rotated to disengage the retainer plate fingers 32 from the lugs 33 and line up the notches 34 with the lugs 33, whereupon the whole assembly is lifted out of the container for cleaning or replacement as required.

The well and heater assembly can be removed for replacement if needed by removing the screws $B_3$, then separating the base sections $B_1$ and $B_2$, then unscrewing the nut 18, and lifting the well upwardly through the hole 15 in the bottom wall of the container.

FIGS. 5 and 6 show the invention embodied in a different type of water heater and dispenser which comprises a container G integrally molded with a base H. The bottom wall 36 of the container has a central hole 37 in which is mounted a pump well and heater assembly J. This assembly includes a well 38 that has a bottom portion 39 wherein the water is heated around which is mounted on electric heater 40 generally in the same manner as the heating coil 9 is mounted on the well portion 8 of FIG. 1. Above the portion 39 is a larger portion 41 providing a well seat 42 between them. The portion 43 above the seat 42 has an exterior crimped bead 44 above which a cylindrical portion 45 extends through the hole 37 in the bottom wall of the container with a flange 46 at its outer end which overlies the inner side of said bottom wall with a sealing ring 47 between them. A similar sealing ring 48 is interposed between the crimped bead 44 and the lower side of the bottom wall of the container. Any suitable temperature control thermostat 49 is mounted in any suitable manner on the wall.

The pump and pump tube assembly K is generally the same as the assembly shown in FIG. 1, comprising an inner pump tube 50 carrying the pump plate 51 and valve disk 52, and an outer tube 53 on which is fixed the retainer plate 54 identical with the retainer plate 29 and having locking fingers 55 coacting with locking lugs 56 on the wall of the well and also having notches 57 providing clearance for said lugs 56. The outer tube has a finger piece spout passage 60 formed in the combined cover and dispensing spout L and having an outlet 61 for discharging hot water into a receptacle M set on the extension platform N of the base. The cover may be removably mounted on the container, but preferably, as shown, there are hinges 62 connecting the cover to the container. Preferably, the base has an opening 64 for access to the heater and well assembly and normally closed by a closure plate 65 removably mounted on the base by bosses and screws 66.

The thermostat is shown as a known type off reset unit which can be reset by any suitable resetting lever 67 that may be combined with a pilot light 68.

The heater and well assembly and the pump and pump tube assembly can be embodied in a generally known type of percolator as shown in FIG. 7. Here, the pot or container O has a bottom wall 69 formed with a hole in which the well is mounted exactly as the well is mounted in FIG. 1. The heated water is dispensed by the inner pump tube 74 into a known type of coffee basket 70 instead of into a cover spout as in FIG. 1, and the beverage is poured from the container through a spout 71. The basket is shown as set on the finger piece 72 which is mounted on the outer pump tube 73 as is the finger piece 21 of FIG. 1.

With reference to FIGS. 1, 2 and 4, it will be seen that the platform C includes a warming plate 75 mounted in an opening 76 in the section $B_2$ of the base in any suitable manner but being shown as having a mounting plate 77 secured on its bottom side provided with struck out portions forming clips 78 embracing a low wattage heating coil 79 that is secured to the underside of said mounting plate. The clips are formed with outstruck fingers forming socket 80, and beaded self-tapping screws 81 extend through bosses 82 on the base section $B_2$ and are screwed into the sockets 80, as best shown in FIG. 1.

The heaters and thermostatic switches are connected in an electrical supply circuit in any suitable known manner which includes the usual supply cord 83 and a main control switch 84.

It will be observed that the retainer plate can be manipulated manually and easily through the open top of the container so that the pump plate can be easily, quickly and positively locked on the well seat and can be easily and quickly released and removed from said seat without any involvement of the container cover or other parts, thereby eliminating the possibility of the pump being accidentally bounced off the well seat when the cover is removed. Further, because of the spring connection between the pump plate and the retainer plate, the pump plate will be resiliently held in contact against the pump seat. Therefore, the seating of the pump plate will be self-aligning, and will automatically compensate for manufacturing tolerances and/or thermal distortions which occur during normal use of the apparatus. It will be understood by those skilled in the art that the invention may be embodied in other apparatus to heat water and pump and dispense the water to any suitable point or receptacle.

I claim:

1. An electric water heater and dispenser comprising a water container having an open top and a bottom wall formed with a hole, a pump well mounted in said hole and depending from said bottom wall and having an upwardly facing pump seat, a pump including a pump tube having mounted thereon a perforated pump plate to separably set on said pump seat and a pump valve coactive with said pump plate, so that when said pump plate is set on said seat, water can be heated in said well below said pump plate and discharged through said pump tube, and means manually manipulatable through said open top for positively and removably locking said pump on said pump seat, said means including a retainer plate slidably mounted on said pump tube, coactive locking means on said retainer plate and said pump well engageable by rotation of said retainer plate relative to said well to releasably hold the retainer plate in fixed position relative to said pump well, spring means disposed between said pump plate and said retainer plate to bias said pump plate away from said retainer plate so that said pump plate will be urged into engagement with said pump seat.

2. The electric water heater and dispenser as defined in claim 1 wherein said retainer plate has locking fingers and said well has locking lugs, said fingers and said lugs forming said coactive locking means, said fingers being engageable with and beneath and disengageable from said lugs upon sliding and rotation of said retainer plate and said retainer plate having notches providing clearance for said lugs during manipulation of said retainer plate.

3. The electric water heater and dispenser as defined in claim 1 wherein said resilient means also resiliently holds the coactive locking means on said retainer plate and said well in locking engagement.

4. The electric water heater and dispenser as defined in claim 3 wherein said spring means comprises a helical compression spring on said pump tube between said pump plate and said retainer plate.

5. The electric water heater and dispenser as defined in claim 1 wherein there is an outer tube rotatable and slidable on said pump tube and said retainer plate is fixed on said outer tube.

6. The electric water heater and dispenser as defined in claim 5 wherein said pump tube has a screw thread segment embossed outwardly in its upper end portion, and said outer tube has an inwardly embossed screw thread coactive with said thread segment providing for assembly of the outer tube on the pump tube and preventing unintended separation of the pump tube and the outer tube when said thread segment is disposed outwardly of the end of the outer tube.

7. The electric water heater and dispenser as defined in claim 1 wherein there is an openable cover for the open top of said container, said cover having a discharge spout and the upper end of said pump tube extends into said spout, whereby the heated water from said pump tube can be dispensed into a receptacle disposed beneath said spout.

8. The electric water heater and dispensed as defined in claim 1 wherein said pump well has a portion extending through said hole in the container bottom and said bottom wall of the container is gripped between parts on said well at opposite sides of said bottom wall.

9. The electric water heater and dispenser as defined in claim 8 wherein said parts are respectively an outwardly extending flange on the upper end of said well and a nut screwed exteriorly on the well beneath said bottom wall of the container.

10. The electric whater heater and dispenser as defined in claim 8 wherein said parts are an outwardly extending flange on the upper end of said well, and a crimped bead on the well beneath said bottom wall of the container.

11. A pump comprising:
 a pump well having a pump seat;
 a pump tube;
 a perforated pump plate fixed on said pump tube adapted to engage said pump seat;
 a pump valve on said pump tube coactive with said pump plate;
 a retainer plate;
 means slidably mounting said retainer plate on said pump tube for movement toward and away from said pump plate;
 means limiting movement of said retainer plate along said pump tube away from said pump plate; and
 coactive locking means on said retainer plate and said pump well for releasably locking said retainer plate to said pump well;
 spring means coacting with said pump plate and said retainer plate to urge said pump plate into engagement with said pump seat.

12. The pump according to claim 11 wherein said means slidably mounting said retainer plate on said pump tube comprise an outer tube concentrically disposed about said pump tube, with said retainer plate fastened to said outer tube.

13. The pump according to claim 12 wherein said means limiting movement of said retainer plate along said pump tube comprise coacting threaded portions on said pump tube and said outer tube constructed so that said outer tube can be threaded past the threaded portion on said pump tube to slide on said pump tube.

14. The pump according to claim 13 wherein said coactive locking means includes engaging means on one of said retainer plate and pump well adapted to engage suitably disposed locking lugs on the other of said retainer plate and pump well upon rotation of said retainer plate.

* * * * *